US007089185B2

(12) United States Patent
Nefian

(10) Patent No.: US 7,089,185 B2
(45) Date of Patent: Aug. 8, 2006

(54) EMBEDDED MULTI-LAYER COUPLED HIDDEN MARKOV MODEL

(75) Inventor: Ara V Nefian, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 593 days.

(21) Appl. No.: 10/180,042

(22) Filed: Jun. 27, 2002

(65) Prior Publication Data

US 2004/0002863 A1   Jan. 1, 2004

(51) Int. Cl.
*G10L 15/14* (2006.01)

(52) U.S. Cl. .................................... 704/256; 704/256.5

(58) Field of Classification Search ................ 704/202, 704/255, 256, 256.1, 256.5; 382/156, 181, 382/190, 277, 302
See application file for complete search history.

(56) References Cited

U.S. PATENT DOCUMENTS

| | | | | |
|---|---|---|---|---|
| 4,977,598 | A * | 12/1990 | Doddington et al. | 704/255 |
| 5,649,056 | A * | 7/1997 | Nitta | 704/256 |
| 5,680,481 | A * | 10/1997 | Prasad et al. | 382/190 |
| 5,689,620 | A * | 11/1997 | Kopec et al. | 706/12 |
| 5,764,853 | A * | 6/1998 | Watari et al. | 704/243 |
| 5,794,190 | A * | 8/1998 | Linggard et al. | 704/232 |
| 6,055,498 | A * | 4/2000 | Neumeyer et al. | 704/246 |
| 6,072,494 | A * | 6/2000 | Nguyen | 715/863 |
| 6,226,611 | B1 * | 5/2001 | Neumeyer et al. | 704/246 |
| 6,246,985 | B1 * | 6/2001 | Kanevsky et al. | 704/270 |

OTHER PUBLICATIONS

Georgescu et al, "Probability estimation in hybrid NH-HMM speech recognition systems with real time neral networks", IEEEE Internation Joint Symposia on Intelligence and Systems, May 21-23, 1998, pp. 412-417.*
Kohir et al, "Face Recognition using a DCT-HMM approach", WACV 1998, Oct. 19-21, 1998, pp. 226-231.*
Naphade et al, "Probabilistic multimedia object (multijects): a novel approach to video indexing and retrieval in multimedia systems", 1998 ICIP, Oct. 4-7; vol. 3 pp. 536-540.*
Kristjansson et al, "Event-coupled hidden Markov models", ICME 2000, vol. 1 pp. 385-388.*

(Continued)

*Primary Examiner*—Richmond Dorvil
*Assistant Examiner*—Michael N. Opsasnick
(74) *Attorney, Agent, or Firm*—Blakely, Sokoloff, Taylor & Zafman LLP

(57) ABSTRACT

An arrangement is provided for embedded coupled hidden Markov model. To train an embedded coupled hidden Markov model, training data is first segmented into uniform segments at different layers of the embedded coupled hidden Markov model. At each layer, a uniform segment corresponds to a state of a coupled hidden Markov model at that layer. An optimal segmentation is generated at the lower layer based on the uniform segmentation and is then used to update parameters of models associated with the states of coupled hidden Markov models at lower layer. The updated model parameters at the lower layer are then used to update the model parameters associated with states at the super layer.

19 Claims, 5 Drawing Sheets

OTHER PUBLICATIONS

Rezek et al, "Coupled hidden Markov models for biosignal interaction modelling", Advances in Medical Signal and information processing, Sep. 4, 2000-Sep. 6, 2000, pp. 54-59.*

Chang et al, "Isolated Mandarin syllable recognition using segmental features", IEE Proceedings—Vision, Image, and Signal Processing, Feb. 1995, pp. 59-64.*

Nefian A. V. et al., "An Embedded HMM—Based Approach for Face Detection and Recognition", Mar. 15, 1999, IEEE, pp. 3553-3556, XP010328136.

Nefian A. V. et al., "A Coupled HMM for Audio-Visual Speech Recognition", May 13, 2002, IEEE, pp. 2013-2016, XP008021462.

Nefian A. V., "Embedded Bayesian Networks for Face Recognition", Aug. 26, 2002, IEEE, pp. 133-136, XP010604715.

M. Brand, "Coupled Hidden Markov Models for Modeling Interacting Processes", Jun. 3, 1997, MIT Media Lab Perceptual Computing, Tech. Report 405, pp. 1-28, XP002253550.

* cited by examiner

EMBEDDED MULTI-LAYER COUPLED HIDDEN MARKOV MODEL

BACKGROUND

A hidden Markov model (HMM) was traditionally used to model one dimensional data for the purposes of pattern recognition. For example, HMMs have been widely used in speech recognition. Speech signals are inherently one dimensional. In speech processing, HMM can be used to model phonemes, words, or even phrases. One of the important characteristics of HMM is its ability to cope with variations in time and in feature space simultaneously, allowing to model data with variations along different dimensions. For example, different people may speak English with different accents. A particular person may speak with different acoustic features at different times. When HMM models are trained based on speech from different speakers at different times, derived HMM models may capture the intrinsic features of the speech and provide models that can tolerate different degrees of variation.

Many pattern recognition problems arise from data residing in a space of higher dimension. For example, identifying a specific object from an image may be a pattern recognition task performed in a two-dimensional (at least) feature space. Detecting the regularity of the heart beat rhythm of a patient from a series of three dimensional heart images reconstructed based on computerized tomography (CT) scans over time may be a pattern recognition problem in a four dimensional space.

Some efforts have been made to extend one-dimensional HMM to more complex structures. For example, a coupled hidden Markov model (CHMM) has been proposed to model two-dimensional data. In CHMM, two one-dimensional HMMs are coupled so that states from one HMM can transit to states of the other HMM. Transition probabilities among states are computed in view of the two-dimensional configuration of the HMMs.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
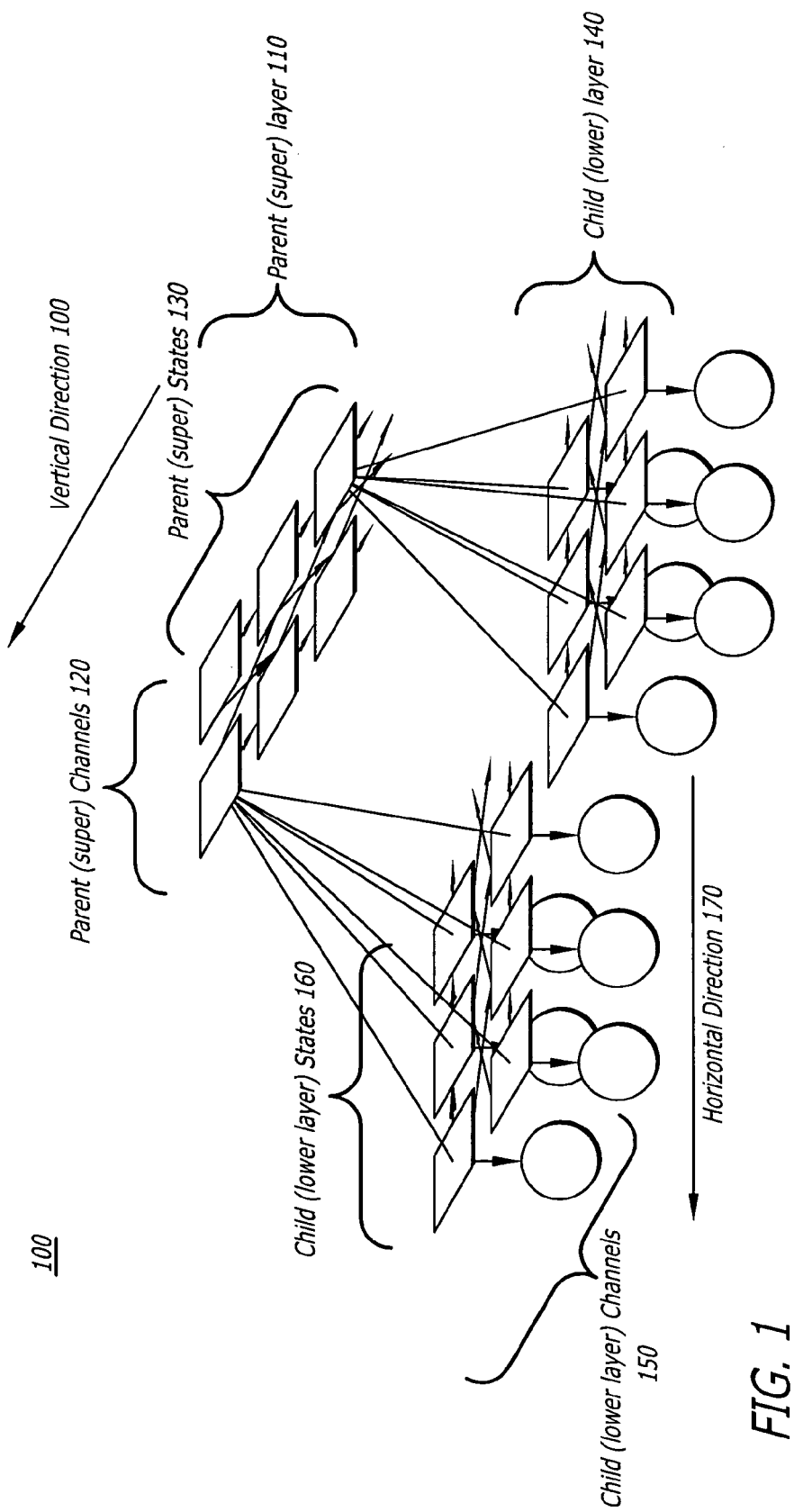
FIG. 1 depicts an exemplary architecture of an embedded coupled hidden Markov model (ECHMM), according to embodiments of the present invention.

FIG. 1 depicts an exemplary architecture of an embedded couple hidden Markov model (ECHMM) 100, according to embodiments of the present invention. The ECHMM 100 may correspond to a hierarchical statistical model, comprising a plurality of layers (two layers are shown in the exemplary embodiment depicted in FIG. 1). Each of the layers may include a plurality of coupled HMM (CHMM). The number of layers in the ECHMM 100 may be correlated with, but is not limited to, the dimension of the underlying data that it attempts to model. For example, if the underlying data is a two-dimensional image, the ECHMM designed to model the image may have two layers. Theoretically, the number of layers in an ECHMM is not limited.

The ECHMM 100 corresponds to an exemplary two-layer architecture. There is a child layer 140 of CHMMs, on which a parent layer CHMM 110 is based. In this exemplary embodiment, the child layer 140 and the parent layer 110 may be designated to be responsible for covering data along directions that are perpendicular to each other. In one embodiment, each of the CHMMs at the child layer 140 may be aligned along horizontal direction 170 while a CHMM at the parent layer 110 may be aligned along the vertical direction 100 of the data. However, there may be other different embodiments to align individual layers of CHMM with the underlying data.

At a lower layer of an ECHMM, there may be more CHMMs than that at higher layer(s). In one embodiment of the present invention, top layer may have only one CHMM. A plurality of lower layer CHMMs may be embedded within a particular higher layer CHMM. For example, in FIG. 1, there are more than one child layer CHMMs that are embedded within a single parent layer CHMM. In general, there can be an arbitrary number of layers with each pair of adjacent layers relating to each other as parent and child layer.

Each CHMM is a HMM with a plurality of channels. Each channel may have a plurality of states. Different channels are coupled in the sense that states in one channel may transit to the states in another channel. For example, a child CHMM at the child layer 140 in FIG. 1 has two channels 150 (child channels) and each channel has more than one child states 160. The super layer 110 has two super channels 120, each of which may have a plurality of super states 130. The CHMMs at each layer may be designed uniformly. That is, CHMMs at the same layer may all have the same number of channels, each of which may have the same number of states. A different embodiment is to have a non-uniform design. The choice of design may be determined according to the nature of the data to be modeled or according to application needs.

In the illustrated embodiment of the present invention, each state within a parent channel at the parent layer may correspond to a CHMM at the child layer. That is, an entire CHMM at the child layer is embedded in one state at the parent layer. With this embodiment, the number of states at the parent layer (total number of state across all channels of parent CHMM) may correspond to the number of CHMMs at the child layer.

According to the illustrated embodiment of the ECHMM 100, each of the CHMM may comprise two channels, each of which may include a plurality of states. This model may inherit the partial size invariance of the hidden Markov model (HMM) or coupled HMM. A coupled HMM (CHMM), due to its pseudo two-dimensional structure, may be used to model two-dimensional data such as images. Such two-dimensional data may have intrinsic semantics to be modeled. For example, a two-dimensional image may represent a human face. Models such as CHMM or ECHMM may be employed to model visual characteristics of human faces for recognition purposes.

Figure 2:
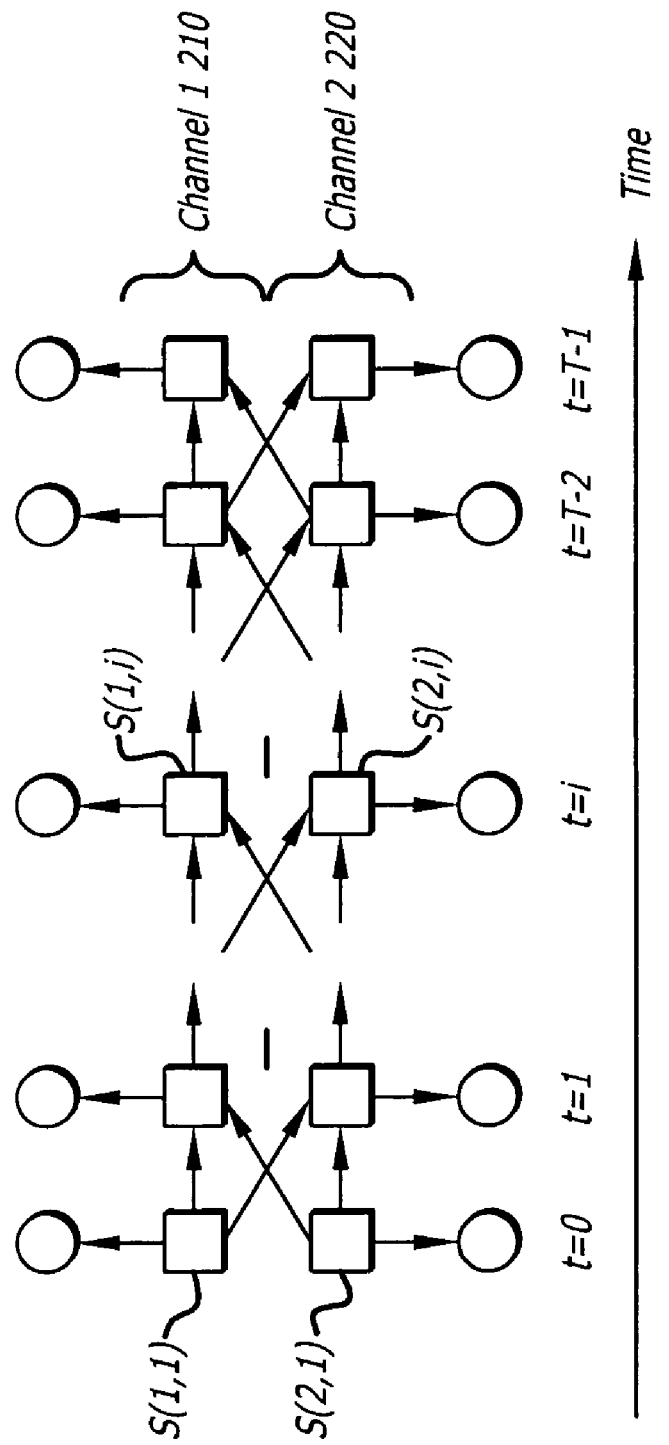
FIG. 2 describes an exemplary coupled HMM, according to embodiments of the present invention.

One embodiment of a CHMM is illustrated below. A CHMM may correspond to a generalization of a HMM. A CHMM may comprise a collection of HMMs, each of which corresponds to a data channel. FIG. 2 illustrates a two-channel CHMM containing a channel 1 210 and a channel 2 220. The squares represent the hidden discrete nodes while the circles describe the continuous observable nodes. Each channel forms an individual HMM with a sequence of states. For example, channel 1 210 has states S(1,1), . . . , S(1,i), . . . , and channel 2 220 has states S(2,1), . . . , S(2,i), . . . , where states in each channel may transit from one to another with certain transit probabilities. In addition, states from channel 1 210 may also transit to states in channel 2 220 with certain transit probabilities. The discrete nodes at time t for each HMM are conditioned by the discrete nodes at time t−1 of all the related HMMs in different channels.

Let C be the number of channels of a CHMM, and $i=[i_1, \ldots, i_c]$ be the state vector describing the state of the hidden nodes in channels $1, \ldots, C$, $q_t=[q_t^1, \ldots, q_t^C]$ at one particular time instance t. The elements of such a coupled HMM include:

$$\pi_0^c(i_c) = P(O_0^c | q_0^c = i_c),$$

the initial state probability of state $i_c$ in channel c, $$a_{i|j}^c = P(q_t^c = i_c | q_{t-1} = j),$$

the state transition probability from state j to state $i_c$ in channel c, $$b_t^c(i_c) = P(O_t^c | q_t^c = i_c),$$

the observation likelihood give the state $i_c$ in channel c.

The parameters of the CHMMs within the same layer may be defined independent of each other. Their parameters may depend on their "parent" CHMM in the parent layer. For two-dimensional data such as images (e.g., face images), a two-layer ECHMM (described in FIG. 1) may be used to model the intrinsic features of 2D imagery data.

The CHMM(s) at the higher layer may be used to model the data along one direction (e.g., vertical). The CHMMs at the lower layer may be used to describe the data along the other (e.g., horizontal) direction. The formulation of the parameters of a two-layer ECHMM is given below. Such formulation may be extended to an ECHMM with arbitrary number of layers. In the illustrated formulation, the channels, nodes and states of the "parent" CHMM are referred to as super channels, super nodes, and super states of the ECHMM. Assume that all the CHMMs in a layer 1 have the same number of channels, denoted by $C_1$. In a two-layer ECHMM, there may include, but are not limited to, the following elements:

initial super state probability in super channel $$s = 1, \ldots, C_0, \pi_{0,0}^s$$

super state transition probability from the sequence of states $j=[j_1, \ldots, j_{C_0}]$ to state $i_s$ in super channel $$s, a_{0,i_s,|j}^s$$

for each super state k in the super channel s, parameters of a corresponding CHMM include:

1. initial state probability in channel $$c = 1, \ldots, C_1, \pi_{1,0}^{s,k,c}$$

2. state transition probability $$a_{1,i_c,|j}^{s,k,c}$$

3. observation probabilities $$b_{t_0,t_1}^{s,k,c}(j_c)$$

If a continuous mixture with Gaussian components is employed for each state, the probability of the observation vector O may then be computed as:

$$b^{s,k,c}(j_c) = \sum_{m=1}^{M_j^{s,k,c}} \omega_{j,m}^{s,k,c} \times N(O, \mu_{j,m}^{s,k,c}, U_{j,m}^{s,k,c}) \qquad (1)$$

where $$\mu_{j,m}^{s,k,c}$$

and $$U_{j,m}^{s,k,c}$$

are the mean and covariance matrix of the with mixture of the Gaussian mixture corresponding to the jth state in the cth channel, $$M_j^{s,k,c}$$

is the number of mixtures corresponding to the jth state of the cth channel, and $$\omega_{j,m}^{s,k,c}$$

is a weight associated with the corresponding mixture.

The observation sequence for a two-dimensional image (e.g., a face image) may be formed from image blocks of size $L_x \times L_y$ that are extracted by scanning the image from left-to-right and top-to-bottom. Adjacent image blocks may be designed to have an overlap by $P_y$ rows in the vertical direction and $P_x$ columns in the horizontal direction. For example, with blocks size of $L_y=8$ rows and $L_x=8$ columns, a six DCT coefficients (a 3×2 low-frequency array) may be employed to create the overlap.

The resulting array of observation vectors may correspond to size of $T_0 \times T_1$, where $T_0$ and $T_1$ are the number of observation vectors extracted along the height (H) and the width (W) of the image, respectively. $T_0$ and $T_1$ may be computed accordingly as:

$$T_0 = \frac{H - L_y}{L_y - P_y} + 1,$$

$$T_1 = \frac{W - L_x}{L_x - P_x} + 1$$

Consecutive horizontal and vertical observation vectors may also be grouped together to form observation blocks. This may be used as a way to consolidate local observations and at the same time to reduce the total amount of observations. It may not be necessary from a theoretical standpoint. In practice, data grouping may serve application needs and improve recognition efficiency.

To compute the number of observation blocks, denote the number of observation blocks in the vertical and horizontal direction be $T_0^0$ and $T_1^0$, respectively. Then, $$T_0^0 = \frac{T_0}{C_0}$$

$$T_1^0 = C_0$$

In addition, denote the number of observation vectors in the horizontal and vertical direction within each observation block by $T_0^1$ and $T_1^1$, respectively, where $$T_0^1 = \frac{T_1}{C_0}$$

$$T_1^1 = C_1$$

Furthermore, denote $O_{t_0,s,t_1,c}$ as the $t_1$th observation vector corresponding to the cth channel within the observation block ($t_0$, s).

For example, in the embodiment described in FIG. 1, following ECHMM model parameters are illustrated: the number of super channels in a CHMM at the parent layer is $C_0=2$ and the number of channels of a child CHMM is $C_1=2$. The number of super states for each super channel may be set according to application requirements. For example, to model a face image, the number of super states in a super channel may be set to be five and the number of states in each child' CHMM may be set to be three. This is partially illustrated in FIG. 3.

Figure 3:
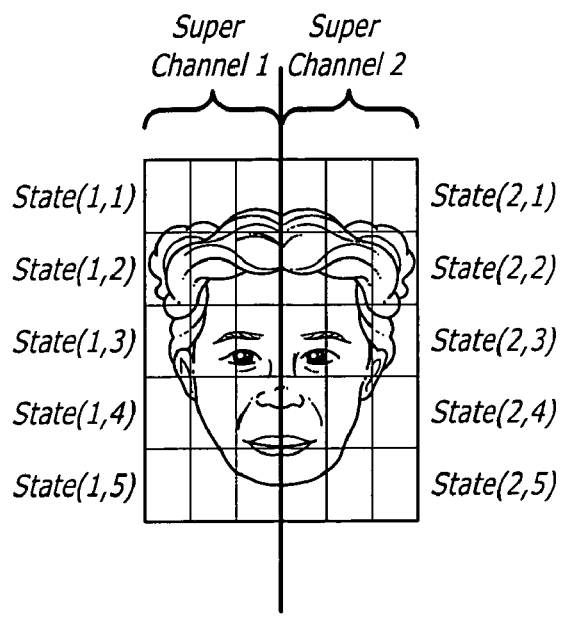
FIG. 3 illustrates an exemplary application of ECHMM to face recognition, according to embodiments of the present invention.

The face image in FIG. 3 is uniformly divided to correspond to two super channels (e.g., super channel 1 and super channel 2), with each super channel having five super states. For instance, super channel 1 has super states (1,1), (1,2), (1,3), (1,4), and (1,5) and super channel 2 has equal number of super states (2,1), (2,2), (2,3), (2,4), and (2,5). Each super state may correspond to a child CHMM, which may further have two channels, each having three states.

To model a face image, the computation of ECHMM model may be performed in a bottom up fashion. Observation blocks may be derived first from a face image and then used to train the ECHMM that is designed to model the face image. To do so, the observation blocks may be used to update the model parameters of each child state as well as the transition probabilities among child states. The embedded child CHMMs that correspond to a parent CHMM are then used to compute the model parameters of each super state as well as transition probabilities.

Each state may have an associated state density function such as a Gaussian mixture with a diagonal covariance matrix. To update the parameters of a state density function, the observation blocks may be segmented first. This may be achieved through optimal state sequence segmentation for the ECHMM. The optimal state segmentation algorithm for the ECHMM 100 may be realized via different implementations. For example, to achieve optimal state segmentation, a Viterbi algorithm for ECHMM may be developed based on an extension of the Viterbi algorithm for HMM.

One of the goals of the Viterbi algorithm for ECHMM may be to determine the optimal state and super state segmentation of the observation sequence. For illustration purposes, the Viterbi algorithm for a two layer ECHMM is described. Such described algorithm may be generalized to fit any ECHMM with an arbitrary number of layers.

For each observation block ($T_0$, s), the Viterbi algorithm for a CHMM is first computed for a given super state $i_s$ of the super channel s. The Viterbi algorithm for a CHMM is described in "A coupled HMM for Audio-Visual Speech Recognition", IEEE International Conference on Acoustics, Speech, and Signal Processing, Vol. 2,pp. 2013–2016, May 2002, herein incorporated in its entirety.

Figure 4:
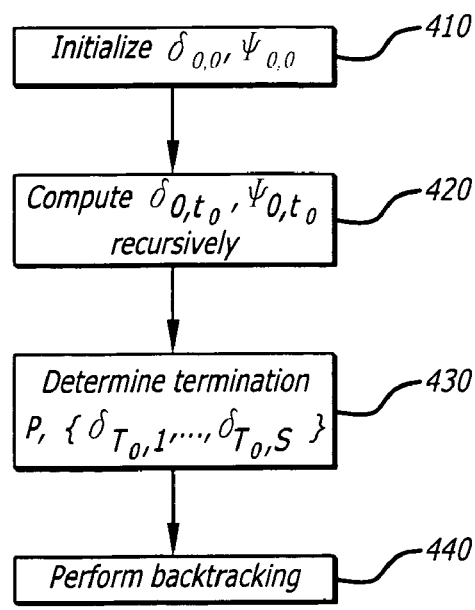
FIG. 4 is a flowchart of an exemplary process, in which Viterbi algorithm is applied to a CHMM to achieve optimal segmentation, according to embodiments of the present invention.

The best super state probability for the observation block $(T_0,s)$, given super state $i_s$ of super channel s, is denoted as $P_{t_0,s}(i_s)$. Corresponding optimal state and optimal state sequence $\beta_{t_0,s,t_1,c}(i_s)$ may then be computed for each super observation. FIG. 4 is a flowchart of an exemplary process, in which the Viterbi algorithm is computed for a CHMM.

The following states (i.e., $\delta_{0,0},\psi_{0,0}$) are first initialized at 410:

$$\delta_{0,0}(i) = \Pi\pi_{0,0}^s(i_s) \times P_{t_0,s}(i_s)$$

$$\psi_{0,0}(i) = 0$$

States $\delta_{0,0},\psi_{0,0}$ are then recursively updated, at 420, according to the following formulation:

$$\delta_{0,t_0}(i) = \max_j \left\{ \delta_{0,t_0-1}(j) \prod_s a^s_{0,i_s,|j_s-1,j_s,j_s+1} \times P_{t_0,s}(i_s) \right\}$$

$$\psi_{0,t_0}(i) = \arg\max_j \left\{ \delta_{0,t_0-1}(j) \prod_s a^s_{0,i_s,|j_s-1,j_s,j_s+1} \times P_{t_0,s}(i_s) \right\}$$

The termination condition is then computed at 430, $$P = \max_i \{\delta_{T_0}(i)\}$$

$$\{\alpha_{T_0,1}, \ldots, \alpha_{T_0,s}\} = \arg\max_i \{\delta_{T_0}(i)\}$$

Based on the computed termination condition, backtracking operation is performed, at 440, according to the following computation:

$$\{\alpha_{T_0,1}, \ldots, \alpha_{T_0,S}\} = \psi_{0,t+1}(\alpha_{T_0+1,1}, \ldots, \alpha_{T_0+1,s})$$

$$q^0_{t_0,s,t_1,c} = \alpha_{t_0,s}$$

$$q^1_{t_0,s,t_1,c} = \beta_{t_0,s,t_1,c}(\alpha_{t_0,s})$$

Figure 5:
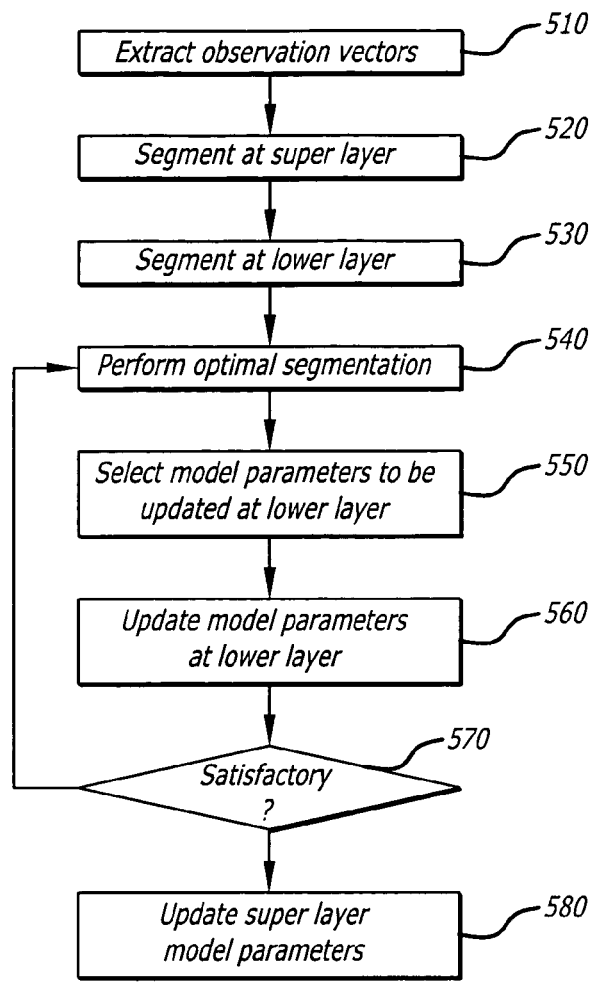
FIG. 5 is a flowchart of an exemplary process, in which an embedded coupled HMM is trained using training data, according to embodiments of the present invention.

FIG. 5 is a flowchart of an exemplary process, in which an ECHMM is trained based on the Viterbi algorithm for CHMM, according to embodiments of the present invention. To train an ECHMM based on given training data (e.g., a set of labeled face images), observation vectors are first extracted, at 510, from the training images. The training may be iterative. That is, each training image may be used individually and iteratively to update model parameters. To train the ECHMM 100, each training image may be first divided into image blocks (discussed earlier). For each of such image blocks, observation vectors may be computed and used to form observation blocks.

To formulate the training process, denote the membership to the rth training image in the training set as super script (r). To derive observation vectors for training purposes, training data may first be uniformly segmented, at 520, along different dimensions at the super layer. For example, the training data may be segmented along vertical dimension into S (vertical) super channels. Then within each of such super channels, training data may further be uniformly segmented, according to the number of super states in each super channel, into a plurality of uniform segments each of which corresponding to a super state (see FIG. 3). Based on the uniform segmentation at the super layer, the observation vectors within each uniform segment may then be uniformly segmented, at 530, according to the number of channels and number of states of each child CHMM.

The density function of each state (including both super states as well as child states) may be initialized before the training takes place. For example, if Gaussian mixture model is adopted for each state, Gaussian parameters for each of the mixture component may need to be initialized. Different approaches may be employed to achieve the initialization of model parameters. For example, one embodiment may be implemented where the observation sequence assigned to each channel c and state j, super state k and super channel s may be assigned to $$M^{s,k,c}_j$$

clusters using, for example, the K-means algorithm.

During the process of training, the original uniform segmentation is updated based on the optimal state segmentation, performed at 540 using the Viterbi algorithm described with reference to FIG. 4. To update the density function of a state, particular relevant parameters to be updated may be determined prior to the update operation. Depending on the density function used for each state, the selection may be carried out accordingly. For example, if Gaussian mixture is adopted, the selection of parameters to be updated may include both the selection of a Gaussian mixture component to update as well as the transition probabilities involved. In this case, all the model parameters associated with the selected Gaussin component may define the parameters to be updated.

The selection of a Gaussian mixture components for each state j and super state k is made at 550. One exemplary criterion to make the selection may correspond to assigning the observation $$O^{(r)}_{t_0,s,t_1,c}$$

from the rth training sample in the training set to the Gaussian component for which the Gaussian density function $$N(O^{(r)}_{t_0,s,t_1,c}; \mu^{s,k,c}_{j,m}, U^{s,k,c}_{j,m})$$

is the highest.

The parameters are then estimated (or updated), at 560, using, for example, an extension of the segmental k-means algorithm. In particular, the estimated transition probability $$a'^s_{0,i_s|j}$$

between super states $i_s$ and j may be obtained as follows:

$$a'^s_{0,i_s|j} = \frac{\sum_r \sum_{t_0} \sum_{t_1} \in^{(r)}_{t_0}(s, i_s, j)}{\sum_r \sum_{t_0} \sum_{t_1} \sum_l \in^{(r)}_{t_0}(s, i_s, l)}$$

where $$\in^{(r)}_{t_0}(s, i_s, l)$$

may equal to one if a transition from state sequence 1 to the super state $i_s$ in super channel s occurs for the observation block $(t_0, s)$ and zero otherwise. The estimated transition probabilities between embedded states $$a'^s_{1,i_s|j}$$

may then be obtained as follows, $$a'^s_{1,i_s|j} = \frac{\sum_r \sum_{t_0} \sum_{t_1} \theta^{(r)}_{t_0,t_1}(s, k, c, i_c, l)}{\sum_r \sum_{t_0} \sum_{t_1} \sum_l \theta^{(r)}_{t_0,t_1}(s, k, c, i_c, l)}$$

where $$\theta^{(r)}_{t_0,t_1}(s, k, c, i_c, l)$$

may be one if in the observation block $(t_0, s)$ a transition from state j to state $i_s$ in channel c occurs for the observation $$O^{(r)}_{t_0,s,t_1,c}$$

and zero otherwise.

The parameters of the selected Gaussian mixture component may also be accordingly updated. The involved Gaussian parameters may include a mean vector $$\mu'^{s,k,c}_{j,m},$$

a covariance matrix $$U'^{s,k,c}_{j,m}$$

of the Gaussian mixture, and the mixture coefficients $$\omega'^{s,k,c}_{j,m}$$

for mixture m of state j in super state k. The updated Gaussian parameters may be obtained according to the following formulations:

$$\mu'^{s,k,c}_{j,m} = \frac{\sum_r \sum_{t_0} \sum_{t_1} \psi^{(r)}_{t_0,t_1}(s, k, c, j, m) \times O^{(r)}_{t_0,s,t_1,c}}{\sum_r \sum_{t_0} \sum_{t_1} \psi^{(r)}_{t_0,t_1}(s, k, c, j, m)}$$

$$U'^{s,k,c}_{j,m} = \frac{\sum_r \sum_{t_0} \sum_{t_1} \psi^{(r)}_{t_0,t_1}(s, k, c, j, m) \times (O^r_{t_0,s,t_1,c} - \mu'^{s,k,c}_{j,m}) \times (O^{(r)}_{t_0,s,t_1,c} - \mu'^{s,k,c}_{j,m})^T}{\sum_r \sum_{t_0} \sum_{t_1} \psi^{(r)}_{t_0,t_1}(s, k, c, j, m)}$$

$$\omega'^{s,k,c}_{j,m} = \frac{\sum_r \sum_{t_0} \sum_{t_1} \psi^{(r)}_{t_0,t_1}(s, k, c, j, m)}{\sum_r \sum_{t_0} \sum_{tl} \sum_{m-1}^M \psi^{(r)}_{t_0,t_1}(s, k, c, j, m)}$$

where $$\psi_{t_0,t_1}^{(r)}(s, k, c, j, m)$$

may equal to one if the observation $$O_{t_0,s,t_1,c}^{(r)}$$

is assigned to super state k in super channel s, state j in channel c and mixture component m, and zero otherwise.

The update of parameters based on a training sample may be carried out iteratively. This may be necessary because the Viterbi algorithm may yield different optimal segmentation during each iteration before convergence. Between two consecutive iterations, if the difference of observation likelihood computed with the Viterbi algorithm is smaller than a specified threshold, determined at 570, the iteration may be terminated at 580. If the difference in likelihood remains larger than the specified threshold, the acts between 540 and 560 may be repeated. The ECHMM corresponds to a complexity of quadratic with respect to the number of states in the model. In addition, ECHMM may be efficiently implemented in a parallel fashion.

Figure 6:
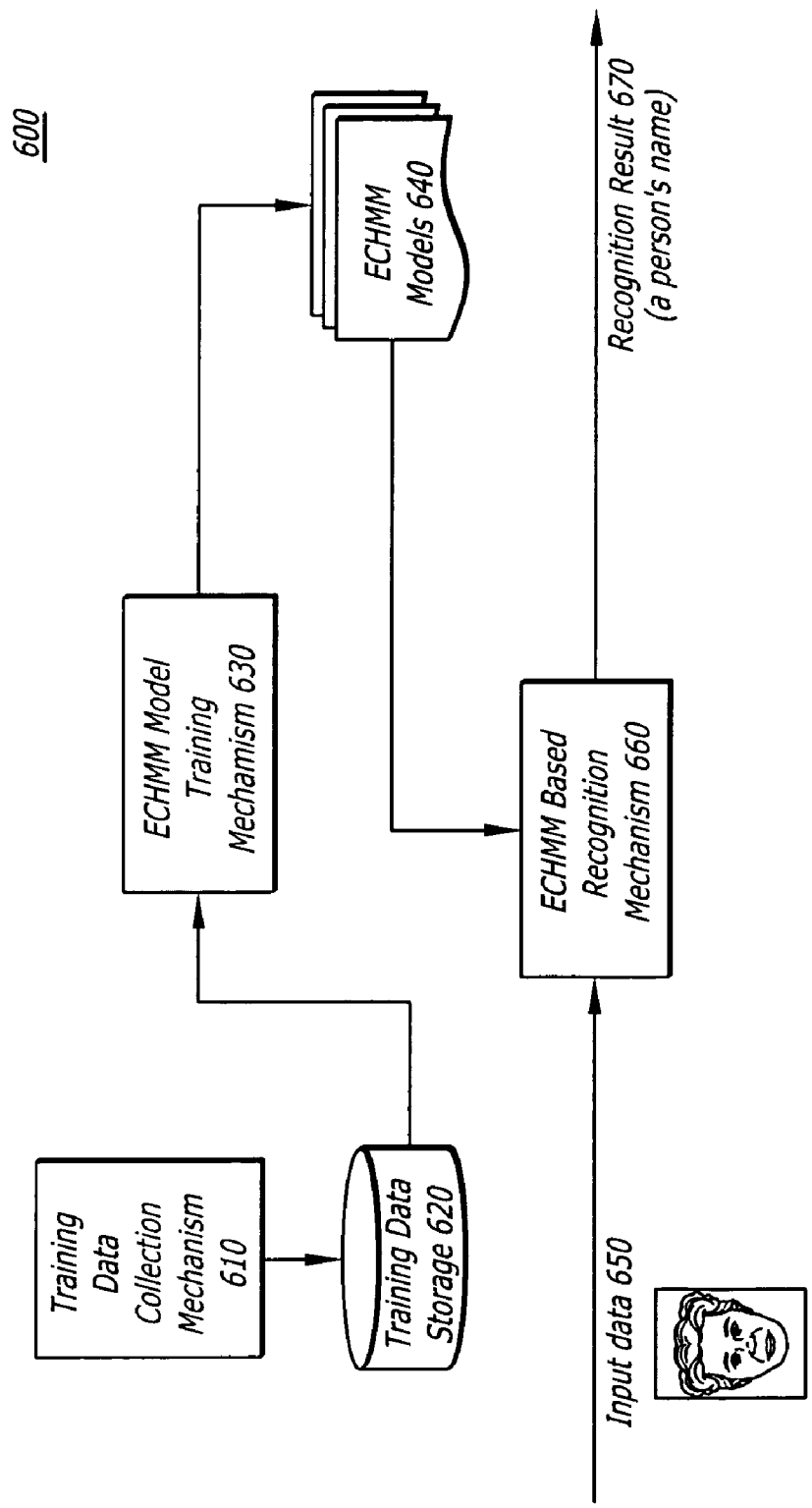
FIG. 6 depicts an architecture, in which ECHMM is applied to a pattern recognition problem, according to embodiments of the present invention.

FIG. 6 depicts an exemplary architecture 600, in which ECHMM 100 is applied to pattern recognition, according to embodiments of the present invention. The architecture 600 may be configured to perform some pattern recognition tasks. For example, a pattern recognition task may include face recognition. The architecture 600 may be applied to the recognition tasks performed on data with an arbitrary dimension. For example, it may be applied to perform recognition of some medical organs imaged in four dimensional space (e.g., 3D volumetric plus time).

The architecture 600 comprises a training data collection mechanism 610, a training data storage 620, an ECHMM model training mechanism 630, a storage that holds a plurality of ECHMM models 640, and an ECHMM based recognition mechanism 660. The training data collection mechanism 610 is responsible for gathering relevant training data and for labeling such data for the purpose of training ECHMM. For example, two dimensional images containing human faces may be collected and each of such collected images may be labeled with an identity corresponding to the face in the image. Different human faces associated with a same identity (e.g., pictures taken from slightly different perspectives) may be labeled with a same identity and used to train or establish an ECHMM that models the face associated with the identity. The collected labeled training data is stored in the training data storage 620.

Using the collected training data, the ECHMM model training mechanism 630 established underlying ECHMM models (640) that are trained to capture the intrinsic characteristics of the underlying patterns presented in the training data. For example, training images with a same label (e.g., pictures of a same person) may be applied as a group to train a particular ECHMM model representing the intrinsic features of the data with that label. Such established ECHMM models may characterize distinct features of the underlying training data. For example, if training data involves human face images, an ECHMM corresponding to a person may capture the intrinsic facial features of the person that reflect characteristics such as the configuration of the eyes, the nose, and the mouth of the underlying subject. Based on such generated ECHMM models, the ECHMM based recognition mechanism 660 takes input data 650 and yields a recognition result 670.

As discussed earlier, the architecture 600 may be applied to the problem of face recognition. In this case, the training data collected may comprise images with human faces in them. Multiple images of each person to be recognized may be collected that correspond to different views of the persons. Such different views may be generated to include variations of the underlying faces. The corresponding ECHMM models derived based on such training face images may capture the distinct facial features of each individual represented by the training face images. ECHMM models trained based on training image of different views may characterize the intrinsic features of each person despite of the variations present in the training images. In this way, recognition accuracy may be improved to provide more robust recognition. To recognize human faces using such derived ECHMM models, the input data 650 may correspond a face image of a person. The ECHMM based recognition mechanism 660 then use the ECHMM models to recognize the person in the given input image.

Figure 7:
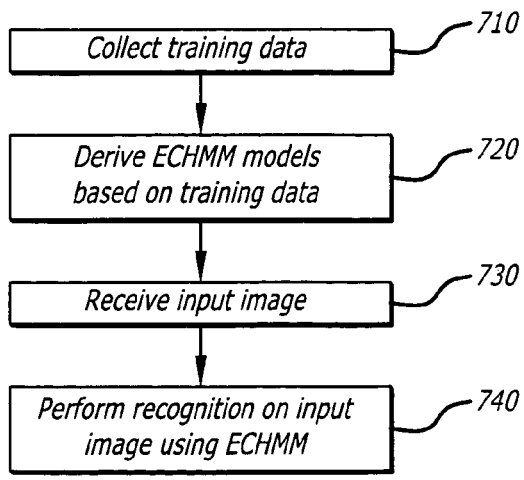
FIG. 7 is a flowchart of an exemplary process, in which ECHMMs are derived based on training data and applied to pattern recognition tasks, according to embodiments of the present invention.

FIG. 7 is a flowchart of an exemplary process, in which ECHMM is applied to a pattern recognition problem, according to embodiments of the present invention. Training data is first collected at 710. Based on gathered training data, ECHMM models are derived at 720. To perform recognition using the derived ECHMM models, input data is received at 730. Recognition is then performed, at 740, on the input data using the ECHMM models derived from the collected training data. The recognition may be performed by applying the observation sequence to the given the parameters of each of the ECHMM models. The recognition result may be obtained by selecting the ECHMM that yields a highest matching score with the observation sequence and that represents a face of a particular person.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A computerized method for generating an embedded couple hidden Markov model for pattern recognition, comprising:

obtaining data of two or more dimensions, the data having a label representing a known pattern;

segmenting the data uniformly into one or more super segments;

assigning each super segment to a super state of a super channel in a coupled hidden Markov model at a super layer of an embedded coupled hidden Markov model, the super layer having at least one super channel;

segmenting each super segment into lower layer segments, each of which corresponds to a lower layer state of a lower channel of a lower layer coupled hidden Markov model associated with one of the super states;

optimally segmenting the data at the lower layer to
produce an optimal segmentation;
updating one or more parameters of at least one model
associated with at least one lower layer state based on
the optimal segmentation; and
updating one or more parameters of at least one model
associated with at least one super state based on the at
least one model associated with the at least one lower
layer state to generate an embedded coupled hidden
Markov model modeling the known pattern for use in
a subsequent pattern recognition task.

2. The method according to claim 1, wherein each super state embeds a coupled hidden Markov model at the lower layer.

3. The method according to claim 2, wherein the coupled hidden Markov model at the lower layer embedded by a super state comprises a plurality of lower layer channels, each of which has a plurality of lower layer states;
the coupled hidden Markov model at the super layer comprises a plurality of super channels, each of which has a plurality of super states.

4. The method according to claim 3, wherein each of the at least one model associated with a state includes at least one of:
a probability density function, characterized by at least one parameter, modeling the state in a feature space; and
a transition probability matrix modeling transitions from the state to other states within a coupled hidden Markov model.

5. The method according to claim 4, wherein the probability density function includes a Gaussian mixture density function.

6. The method according to claim 5, wherein the optimally segmenting includes using a Viterbi algorithm.

7. The method according to claim 6, further comprising:
computing observation vectors from the data prior to said optimally segmenting; and
selecting the one or more parameters of models associated with the at least one lower layer state based on the observation vectors and the optizrial segmentation prior to updating at the lower layer.

8. The method according to claim 7, wherein said optimally segmenting and updating one or more parameters at the lower layer are iterated until a pre-determined criterion is satisfied.

9. The method according to claim 8, wherein the pre-determined criterion includes a condition that difference in the updated models between two consecutive the updating one or more parameters is below a threshold.

10. A computerized method for generating an embedded coupled hidden Markov model for pattern recognition, comprising:
deriving at least one embedded coupled hidden Markov model based on one or more training samples, each of which having a label representing a known pattern, each of the at least one embedded coupled hidden Markov model modeling a corresponding known pattern, wherein the embedded coupled hidden Markov model comprises a plurality of coupled hidden Markov models, said deriving comprises:
collecting the training samples;
for each of the training samples that have a same label representing a same known pattern;
segmenting data in each of the training samples uniformly into one or more super segments;
assigning each super segment to a super state of a super channel in a coupled hidden Markov model at a super layer of an embedded coupled hidden Markov model, the super layer having at least one super channel;
segmenting each super segment into lower layer segments, each of which corresponds to a lower layer state of a lower channel of a lower layer coupled hidden Markov model associated with one of the super states;
optimally segmenting the data at the lower layer to produce an optimal segmentation;
updating one or more parameters of at least one model associated with at least one lower layer state based on the optimal segmentation to produce updated models associated with the at least one lower layer state; and
updating one or more parameters of at least one model associated with at least one super state based on the undated models associated with the at least one lower layer state to generate an updated embedded coupled bidden Markov model modeling the same known pattern;
receiving input data of two or more dimensions, the input data being indicative of a pattern; and
recognizing the pattern in the input data with respect to the known patterns based on the at least one embedded coupled hidden Markov model.

11. The method according to claim 10, wherein the input data includes a two-dimensional image containing an imagery of a human face.

12. The method according to claim 11, wherein said recognizing the pattern in the input data includes recognizing the identity of a human face appearing in a two dimensional image.

13. An article of generating an embedded coupled bidden Markov model for pattern recognition, comprising a computer readable storage medium having stored thereon instructions that, when executed by a machine, result in the following:
obtaining data of two or more dimensions, the data having a label representing a known pattern;
segmenting the data uniformly into one or more super segments;
assigning each super segment to a super state of a super channel in a coupled hidden Markov model at a super layer of an embedded coupled hidden Markov model, the super layer having at least one super channel;
segmenting each super segment into lower layer segments, each of which corresponds to a lower layer state of a lower channel of a lower layer coupled hidden Markov model associated with one of the super states;
optimally segmenting the data at the lower layer to produce an optimal segmentation;
updating one or more parameters of at least one model associated with at least one lower layer state based on the optimal segmentation; and
updating one or more parameters of at least one model associated with at least one super state based on the at least one model associated with the at least one lower layer state to generate an embedded coupled Markov model modeling the known pattern.

14. The article comprising a computer readable storage medium having stored thereon instructions according to claim 13, wherein each of the at least one super state embeds a coupled bidden Markov model at the lower layer.

15. The article comprising a computer readable storage medium having stored thereon instructions according to claim 14, wherein the coupled hidden Markov model at the lower layer embedded by a super state comprises a plurality of lower layer channels, each which having a plurality of lower layer states;

the coupled hidden Markov model at the super layer comprises a plurality of super channels, each of which having a plurality of super state.

16. The article comprising a computer readable storage medium having stored thereon instructions according to claim 15, wherein each of the at least one model associated with a state includes at least one of:

a probability density function, characterized by at least one parameters, modeling the state it, a feature space; and a transition probability matrix modeling transitions from the state to other states within a coupled hidden Markov model.

17. The article comprising a computer readable storage medium having stored thereon instructions according to claim 16, wherein the performing optimal segmentation includes performing optimal segmentation using Viterbi algorithm.

18. An article for generating an embedded coupled hidden Markov model for pattern recognition, comprising a computer readable storage medium having stored thereon instructions that, when executed by a machine, result in the following:

deriving at least one embedded coupled bidden Markov model, each of which modeling a known pattern, using one or more training sample, each of which having a label representing a known pattern, each of the at least one embedded hidden Markov model modeling a corresponding known pattern, wherein the embedded coupled hidden Markov model comprises a plurality of coupled hidden Markov models, said depriving comprises:

collecting the training samples. for each of the training samples that have a same label representing a same known pattern:

segmenting data in each of the training samples uniformly into one or more super segments.

assianing each super segment to a super state of a super channel in a coupled hidden Markov model at a super layer of an embedded coupled hidden Markov modeL the super layer having at least one super channel, segmenting each super segment into lower laver segments, each of which corresponds to a lower layer state of a lower channel of a lower layer coupled hidden Markov model associated with one of the super states, optimally segmenting the data at the lower layer to produce an optimal segmentation, updating one or more parameters of at least one model associated with at least one lower layer state based on the optimal segmentation to produce updated models associated with the at least one lower layer state, and updating one or more parameters of at least one model associated wit at least one super state based on the updated models associated with the at least one lower layer state to generate an updated embedded coupled hidden Markov model modeling the same known pattern;

receiving input data of two or more dimensions, the input data containing data indicative of a pattern, and recognizing the pattern from the input data with respect to the known patterns using the at least one embedded coupled hidden Markov model.

19. The article comprising a computer readable storage medium having stored thereon instructions according to claim 18, wherein the input data includes a two-dimensional image containing an imagery of a human face; and said recognizing the pattern includes recognizing the identity of a human face appearing in a two-dimensional image.

* * * * *

UNITED STATES PATENT AND TRADEMARK OFFICE
CERTIFICATE OF CORRECTION

PATENT NO. : 7,089,185 B2
APPLICATION NO. : 10/180042
DATED : August 8, 2006
INVENTOR(S) : Nefian It is certified that error appears in the above-identified patent and that said Letters Patent is hereby corrected as shown below:

In column 5, at line 20, delete "with" and insert --mth--.

In column 13, at line 42, delete "optizrial" and insert --optimal--.

In column 14, at line 1, delete "cach" and insert --each--.

In column 14, at line 17, delete "undated" and insert --updated--.

In column 14, at line 19, delete "bidden" and insert --hidden--.

In column 14, at line 33, delete "bidden" and insert --hidden--.

In column 14, at line 64, delete "bidden" and insert --hidden--.

In column 15, at line 13, delete "it," and insert --in--.

In column 15, at line 28, delete "bidden" and insert --hidden--.

In column 15, at line 37, delete ".".

In column 16, at line 3, delete "assianing" and insert --assigning--.

In column 16, at line 5, delete "modeL" and insert --model--.

In column 16, at line 7, delete "laver" and insert --layer--.

In column 16, at line 18, delete "wit" and insert --with--.

Signed and Sealed this

Sixth Day of November, 2007

JON W. DUDAS
*Director of the United States Patent and Trademark Office*